(12) United States Patent
Kozlov et al.

(10) Patent No.: US 7,717,273 B2
(45) Date of Patent: May 18, 2010

(54) MEMBRANE SURFACE MODIFICATION BY RADIATION-INDUCED POLYMERIZATION

(75) Inventors: Mikhail Kozlov, Belmont, MA (US); Wilson Moya, Concord, MA (US)

(73) Assignee: Millipore Corporation, Billerica, MA (US)

( * ) Notice: Subject to any disclaimer, the term of this patent is extended or adjusted under 35 U.S.C. 154(b) by 26 days.

(21) Appl. No.: 11/800,821

(22) Filed: May 8, 2007

(65) Prior Publication Data

US 2007/0272607 A1 Nov. 29, 2007

Related U.S. Application Data

(60) Provisional application No. 60/802,909, filed on May 24, 2006.

(51) Int. Cl.
| | |
|---|---|
| *B01D 71/06* | (2006.01) |
| *B01D 29/00* | (2006.01) |
| *B01D 39/00* | (2006.01) |
| *B01D 67/00* | (2006.01) |

(52) U.S. Cl. .............. 210/500.27; 210/500.34; 210/500.36; 210/500.42; 210/490; 210/500.41; 264/48

(58) Field of Classification Search ........... 210/500.27, 210/500.35, 500.36, 500.42, 500.41, 490, 210/500.34; 264/48; 427/244, 412.1, 393.5; 428/304.4, 315.5
See application file for complete search history.

(56) References Cited

U.S. PATENT DOCUMENTS

| | | | |
|---|---|---|---|
| 3,253,057 A | | 5/1966 | Lander et al. |
| 3,941,718 A | * | 3/1976 | Barabas et al. ............. 502/62 |
| 4,058,401 A | | 11/1977 | Crivello |
| 4,151,225 A | | 4/1979 | Buning |
| 4,278,777 A | | 7/1981 | Jakabhazy et al. |
| 4,311,573 A | | 1/1982 | Mayhan et al. |
| 4,618,533 A | | 10/1986 | Steuck |
| 4,690,765 A | * | 9/1987 | Linder et al. ............. 210/654 |
| 4,839,203 A | * | 6/1989 | Davis et al. ............. 427/244 |
| 4,948,505 A | * | 8/1990 | Petrucci et al. ............ 210/238 |
| 5,019,261 A | * | 5/1991 | Stengaard .............. 210/490 |
| 5,118,424 A | * | 6/1992 | McRae ................. 210/653 |
| 6,193,077 B1 | | 2/2001 | Witham et al. |
| 6,734,386 B1 | * | 5/2004 | Lauterbach et al. .... 219/121.59 |
| 2003/0077435 A1 | * | 4/2003 | Charkoudian et al. .... 428/304.4 |
| 2006/0051647 A1 | * | 3/2006 | Tachibana et al. ............. 429/33 |

FOREIGN PATENT DOCUMENTS

| | | | |
|---|---|---|---|
| EP | 1643579 | | 4/2006 |
| EP | 1742286 A1 | * | 10/2007 |
| EP | 1859855 A1 | * | 11/2007 |

OTHER PUBLICATIONS

Wang et al., 2002, *J. Membr. Sci.*, 195:103.

* cited by examiner

*Primary Examiner*—Ana M Fortuna

(57) ABSTRACT

The invention provides porous membranes with at least a partially modified surface as well as methods of making and using the same.

24 Claims, No Drawings

MEMBRANE SURFACE MODIFICATION BY RADIATION-INDUCED POLYMERIZATION

CROSS REFERENCED RELATED APPLICATIONS

This application claims the benefit of U.S. Provisional Patent Application No. 60/802,909, filed on May 24, 2006.

FIELD OF THE INVENTION

The invention relates generally to the field of separation technology. In certain specific embodiments the invention provides porous membranes comprising modified surfaces and methods of making and using the same, as well as systems comprising porous membranes comprised of modified surfaces.

BACKGROUND OF THE INVENTION

Porous membranes may be used in a wide variety of applications including filtration technology. The physical and chemical demands on materials used in casting porous membranes can be stringent and difficult to meet. On the one hand it is often desirable to have a membrane comprised of a bulk matrix, e.g. a polymer, which is mechanically strong, thermally stable and chemically inert to most solvents. Typically, polymers meeting these needs will be hydrophobic, although hydrophilic porous membranes, e.g., comprising cellulose, polyamides and the like have been described. Membranes comprised of a hydrophobic bulk matrix will typically have hydrophobic surfaces and thus need to be pre-wetted with an organic solvent in order for most aqueous solutions to pass through. Pre-wetting, however, introduces contaminants, and increases the time and cost of the separation.

Porous membranes are typically used in the separation and purification of complex biomolecules comprised of proteins, peptides, lipids, carbohydrates and the like. These complex biomolecules, tend to interact non-specifically via hydrophobic interactions with the hydrophobic surfaces comprising the porous membranes or via forming ionic or hydrogen bonds with groups on the surface of some hydrophilic membranes, thus resulting in membrane fouling, poor separation and low product yield. Unmodified membranes may thus be poorly suited for many filtration applications involving biological applications. In contrast, hydrophilic membranes comprised of neutral surfaces do not require pre-wetting with an organic solvent and often obviate problems of non-specific hydrophobic or charge-charge interactions between biomolecules and porous membranes encountered during various types of filtration.

One possible approach to the problem of non-specific interactions between biomolecules and porous membranes might be to modify the surface of the bulk matrix comprising porous membranes with a hydrophilic material having a neutral surface. A number of approaches to membrane surface modification have been described to date. These approaches, however, are not without their shortcomings.

One general approach to the problem involves the grafting of a hydrophilic material onto the surface of a porous membrane. Grafting results in a covalently linked coating on the surface of the membrane, see, e.g., U.S. Pat. Nos. 3,253,057; 4,151,225; 4,278,777 and 4,311,573. Grafting may be performed by random oxidation using plasma or corona discharge. This approach may be employed for surface activation of polymer films. Its effects are generally limited due to the limited penetration of active gas species into the porous material.

Grafting may have deleterious effects on the bulk matrix of the porous membrane. The deleterious effects to a membrane introduced by grafting include an increased tendency of the grafted membrane to swell, which in turn may alter the integrity of the membrane and lead to poor permeability.

Another modification technique is the formation of thin cross-linked polymer film on the membrane surface over the course of free radical polymerization of hydrophilic monomers as disclosed in the U.S. Pat. No. 4,618,533. Acrylic-based crosslinkers are typically used.

Methods that teach coating the membrane surface with a mixture of desirable coating molecule and an acrylic cross-linker have been described, see, e.g. U.S. Pat. No. 6,193,077. Also, porous membranes coated with polyethylene glycol (PEG) using argon plasma without an acrylic cross-linker have also been described, see, e.g., Wang et al., 2002, *J. Membr. Sci.*, 195:103. Plasma, however, has limited utility due its inadequate penetration into the porous material.

There are several disadvantages associated with the use of acrylic-based coatings. Included among these are their poor stability towards treatment with a concentrated alkaline solution, a preferred method for cleaning filter assemblies comprising porous membranes. Another disadvantage is that these coatings typically exhibit poor heat stability, thus precluding the use of PEG-based monomers which would make a good protein-repellent surface. Additionally, previously described methods may involve the introduction of trace amounts of carboxylic groups to the membrane, which tend to attract oppositely, charged proteins resulting in non-specific binding to the membrane. Finally, pore plugging remains a problem with many previously described techniques used to modify porous membrane surfaces thus limiting application of this technique.

It would, therefore, be desirable to provide surface modification for porous membranes that overcome the shortcomings described above. In particular, a need exists to provide a porous membrane which does not require prewetting with an organic solvent, and which minimizes non-specific interactions with biomolecules such as proteins and peptides, while at the same time maintaining stability under alkaline conditions typically used to clean membranes. Various embodiments of the invention described herein meet these needs.

SUMMARY OF THE INVENTION

In certain embodiments the invention provides porous membranes comprising modified surfaces and methods of making and using the same, as well as systems comprising porous membranes comprised of modified surfaces. In various embodiments the invention provides porous membranes comprised of modified surfaces which impart desirable chemical or physical properties which are tailored to meet the needs of specific applications. In some embodiments the invention provides a porous membrane wherein, the modified surface comprises a polymeric composition, which does not require pre-wetting with an organic solvent prior to filtration of a solution, and which minimizes the non-specific interactions of biomolecules (e.g., the hydrophobic, or charge-charge interaction between the membrane and a protein, peptide, lipid, or carbohydrate, or other molecule derived from a biological source, that is passed through the membrane), and which maintains stability under suitable conditions for cleaning the porous membrane, e.g., alkaline conditions. The surface-modifying composition may contact all the surfaces of the porous membrane, including the surfaces which line the pores which traverse the membrane.

In some embodiments the invention provides a method of modifying at least a portion of the surface of a porous membrane comprising:

a) contacting the porous membrane with: 1) monomers comprised of two or more polymerizable groups, or a mixture of monomers where at least one of the monomers is comprised of, or consists essentially of, only one polymerizable group and at least one of the monomers is comprised of two or more polymerizable groups; 2) a cationic polymerization initiator; and 3) optionally one or more of the following: functional monomers, additives, and a solvent, all of which are described infra b) where a solvent is used, optionally removing the solvent; c) polymerizing the monomers of 1) thereby modifying at least a portion of the surface of the porous membrane. Additional optional steps may include exposing the porous membrane to a form of energy, such as radiant energy such that a strong acid is formed which may act as a polymerization initiator. Other optional steps may include rinsing the porous membrane of c) with a suitable solvent e.g., to wash away non-polymerized material.

In other embodiments the invention provides a system for modifying at least a portion of the surface of a porous membrane comprising: a) a porous membrane having a surface; b) monomers comprised of two or more polymerizable groups, or a mixture of monomers where at least one of the monomers is comprised of, or consists essentially of, only one polymerizable group and at least one of the monomers is comprised of two or more polymerizable groups; c) a cationic polymerization initiator; and) optionally one or more of the following: 1) functional monomers; 2) additives; 3) a solvent and 4) a source of energy.

In yet other embodiments the invention provides a modified porous membrane comprising: a porous membrane having a surface; wherein monomers comprised of two or more polymerizable groups, or a mixture of monomers where at least one of the monomers is comprised of, or consists essentially of, only one polymerizable group and at least one of the monomers is comprised of two or more polymerizable groups are polymerized in contact with said surface; and wherein said polymerization is facilitated by a cationic polymerization initiator and optionally, one, or both of, a source of energy and a solvent; and wherein, the modified surface further optionally comprises one, or more of the following: 1) functional monomers; 2) additives.

In further embodiments the invention provides a porous membrane comprising at least a partially modified surface wherein the porous membrane is modified by a) contacting the porous membrane with: 1) monomers comprised of two or more polymerizable groups, or a mixture of monomers where at least one of the monomers is comprised of, or consists essentially of, only one polymerizable group and at least one of the monomers is comprised of two or more polymerizable groups; 2) a cationic polymerization initiator; and 3) optionally one or more of the following: functional monomers, additives both of which are described infra, and a solvent c) polymerizing the monomers of 1) thereby modifying at least a portion of the surface of the porous membrane.

In still other embodiments the invention provides a method of filtering a solution comprising one or more biomolecules, where the method comprises contacting a microporous membrane comprised of at least a partially modified surface with the solution comprising one or more biomolecules, wherein the membrane surface has been at least partially modified by a) contacting the porous membrane with: 1) monomers comprised of two or more polymerizable groups, or a mixture of monomers where at least one of the monomers is comprised of, or consists essentially of, only one polymerizable group and at least one of the monomers is comprised of two or more polymerizable groups; 2) a cationic polymerization initiator; and 3) optionally one or more of the following: functional monomers, additives, and a solvent c) polymerizing the monomers of 1) thereby modifying at least a portion of the surface of the porous membrane.

DESCRIPTION OF THE EMBODIMENTS

Cationic Polymerization

In certain embodiments the invention relates to the surprising discovery that cationic polymerization may be used to modify at least a portion of the surface of a porous membrane comprised of a bulk matrix, e.g., a polymer. Cationic polymerization has been used to create sealants, coatings and encapsulants, see, e.g., U.S. Pat. No. 4,058,401. In some instances, these coatings are applied as paint or coatings on solid objects such as aluminum cans, but not as surface-modifying compositions of porous membranes.

Cationic polymerization involves three phases: initiation, propagation and termination. The reaction begins with the generation of an initiator bearing a positive charge. Typically, cationic polymerization may be initiated by strong acids in an environment free of nucleophiles. Propagation follows next and involves the addition of polymeric species to a growing chain, which will also bear a positive charge. Termination ends the propagation reaction and occurs when the growing chain recombines with any nucleophile such as an amine or water molecule.

Strong acids may be generated by exposing a cationic polymerization photoinitiator to an energy source. The energy source may include ionizing and non-ionizing radiation such as ultraviolet light (UV), visible light, infrared light, gamma radiation, radiation from an electron beam (EB), microwave and radio-frequency radiation. In some embodiments where the surface-modifying polymeric composition is prepared from a vinyl ether, an electron beam by itself may be sufficient for initiating cationic polymerization, without the need for a photoinitiator. Exposing the initiator to the energy source results in the formation of the charged species described above. In some embodiments thermal energy may be suitable for initiating cationic polymerization. In yet other embodiments a strong acid initiator may be provided without the need for the energy source to generate the initiator. Examples of such a strong acid would include trifluoromethane sulfonic acid, hexafluorophosphoric acid, perchloric acid, etc.

Photo-initiators useful for generating strong acids as initiators of cationic polymerization include diazonium salts, onium salts, and organometallic complexes, which may induce the formation of a strong acid when an external energy source is applied. The onium salts may include salts of Group VIa elements. The salts may be aromatic onium salts. Cations of onium salts may typically be comprised of diphenyliodonium and triphenylsulfonium, as well as their substituted variants. Examples of suitable onium salts include, but are not limited to, diphenyl iodonium hexafluorophosphate, tetramethylene sulfonium hexafluoroarsenate, triphenylsulfonium fluoroborate, triphenylsulfonium chloride, diphenyliodonium fluoroborate, triphenylsulfonium hexafluoroarsenate, and triphenylsulfonium hexafluoroantimonate. Diazonium salts are typically comprised of a diazonium cation ($C_6H_5N_2+$) or its substituted variants and may comprise anions such as triflate, hexafluorophosphate, p-toluenesulfonate, perfluoro-1-butanesulfonate, nitrate and other anions of strong acids. Organometallic complexes usually contain iron-arene salts having anions of low nucleophilicity, e.g. Irgacure 261 (M.F. Cachat Company, Lakewood, Ohio).

The concentration of initiator effective in cationic polymerization may be determined based on a variety of factors such as the amount of moisture present or the desired reaction rate. Water, e.g., atmospheric humidity, may quench the reaction. In some embodiments the concentration of initiator ranges from 1-10% weight; 0.1-20% weight; 0.01-25% weight; 0.5-5% weight; 0.9-1% weight; 1-3% weight. In a specific embodiment the concentration of the initiator is 0.1% weight.

The solution of polymerizable monomer (e.g., monomers comprised of two or more polymerizable groups, or a mixture of monomers where at least one of the monomers is comprised of, or consists essentially of, only one polymerizable group and at least one of the monomers is comprised of two or more polymerizable groups) for cationic polymerization may be prepared using any suitable solvent, e.g. an organic solvent that is inert to the porous membrane (i.e., will not dissolve it or swell it to the extent that the pore size integrity is compromised), or water or no solvent at all.

In certain embodiments where water is used as a solvent it may be evaporated prior to polymerization. In other embodiments any solvent used may be removed from the membrane by evaporating, freeze-drying, exchanging for non-solvent, etc. In some embodiments the partition of monomers from the solvent onto the surface of the membrane prior to polymerization is also contemplated thereby eliminating the need for removal or evaporation of the solvent. In other embodiments it may be desirable to forego using any solvent, e.g., using only one or more polymerizable monomers and an initiator when a dense coating is desired. The membrane will remain porous but will be filled, i.e., it will not have flux. This type of modified membrane may be used in dialysis for example.

In embodiments where a solvent is used, the solvent should be capable of dissolving components of the polymerization mix (initiators, monomers etc). Because water may quench the polymerization reaction in some cases, suitable solvents may have a low water content, e.g., less than 1%, less than 0.1%, less than 0.01%, less than 0.001%, less than 0.0001%. If water is used as solvent, it has to be removed, e.g. evaporated, prior to effecting the polymerization reaction. Suitable solvents for membranes comprised of various bulk matrix materials is provided below in Table 1:

TABLE 1

| Membrane material | Solvents |
|---|---|
| Cellulose, Polyamides, Polysulfones (polysulfone, polyethersulfone, polyphenylsulfone, etc.) and Polyvinylidene fluoride | Water, Methanol, Ethanol, Isopropanol, acetonitrile, hexane, cyclohexane, petroleum ether, benzene, tetrachloromethane |
| Polytetrafluoroethylene, FEP Polyolefins (polyethylene, polypropylene) | Water, Methanol, Ethanol, Isopropanol, acetonitrile, hexane, cyclohexane, petroleum ether, diethyl ether, acetone, tetrahydrofuran, dichloromethane |

A variety of useful additives to the cationic polymerization reaction are contemplated in some embodiments. Additives may include diluents, photosensitizers and retardants, which may be added to the cationic polymerization reaction to control the rate and extent of the polymerization reaction. In certain embodiments these reagents may serve as chain terminators in the cationic polymerization reaction. These reagents may thus be used to control the degree of polymerization of the monomer, which may translate into different swelling and stability behavior of the modified membrane surface. Examples of suitable diluents include any nucleophile, such as an amine, a polymeric alcohol and water. Examples of photosensitizers are polynuclear aromatic compounds, such as anthracene, pyrene, and perylene. Other additives may include surfactants. Thus, the surface-modifying polymer may be combined in some embodiments with a suitable surfactant to prevent the polymer from beading up on the membrane surface and to ensure an even coating of all targeted surfaces. An example of a suitable surfactant includes hexadecafluorosulphonic acid potassium salt.

Functional monomers are also contemplated as potentially useful additions to the cationic polymerization reaction in some embodiments. These reagents may be comprised of particular chemical functional groups and may be chosen to impart a specific property to the membrane surface, e.g., the ability to attract, bind or repel an analyte of interest contained in a sample to be applied to the porous membrane as part of a separation method. Vinyl ethers and glycidyl ethers may be derivatized with a variety of chemical species and thus provide functional monomers. Another functional monomer may include molecules containing a quaternary ammonium salt (with a non-nucleophilic counterion) and a polymerizable group could be used to incorporate a permanent positive charge into the membrane.

Porous Membranes and Surface-Modifying Polymers

In certain embodiments the invention provides a porous membrane comprising at least a partially modified surface. In some embodiments all surfaces of the porous membrane are modified, e.g., by applying a polymeric composition to the surface, including the surfaces lining the pores which traverse the depth of the membrane. Any membrane may be modified using cationic polymerization as described herein. The membrane may comprise a hydrophobic or hydrophilic bulk matrix material which is modified with a polymeric composition, e.g., a hydrophilic polymer. In some embodiments the membrane may be modified using cationic polymerization so as to limit or eliminate non-specific binding of molecules contained in a solution which is passed through the membrane.

Depending on the presence and type of chemical functional groups in the bulk matrix material of the membrane, the surface-modifying composition may or may not be covalently linked to the surface of the membrane. Thus, in some embodiments the surface-modifying polymeric composition will fit over the surface of the porous membrane, but will not be chemically bound to the surface of the membrane. Advantageously, modifying the membrane without covalently binding the coating results in a surface which provides for a more robust and stable membrane that is not subject to swelling, and the accompanying compromise to structural integrity experienced by grafted membranes when placed in an aqueous solvent. The surface-modifying composition may be comprised of polymerized polyfunctional monomers that will not be subject to alkaline hydrolysis which otherwise might occur under conditions employed in cleaning the porous membrane prior to use, e.g., before a bio-separation, or during storage.

The surface of the porous membrane may be modified without the use of acrylate-based functionalities or the use of plasma or corona discharge, thus avoiding the toxicities associated with acrylic reagents, and the less than adequate coating penetration into the pores of the membrane resulting from plasma and corona discharge. In some embodiments the surface of a porous membrane is modified using radiation induced cationic polymerization. Surface, as used herein, refers to both exterior surfaces of the membrane, e.g. a top surface, a bottom surface, as well as interior surfaces which line the pores which traverse the depth of the membrane from the top surface to the bottom surface.

The bulk matrix of a porous membrane may be comprised of any suitable material such as one or more polymers. Representative suitable polymers for forming the porous membrane include polyolefins such as polyethylene, polypropylene, polymethylpentene, or the like; polystyrene or substituted polystyrenes; fluorinated polymers including poly(tetrafluoroethylene), polyvinylidene fluoride or the like; polysulfones such as polysulfone, polyethersulfone or the like; polyesters including polyethylene terephthalate, polybutylene terephthalate or the like; polyacrylates and polycarbonates; vinyl polymers such as polyvinyl chloride and polyacrylonitriles; cellulosics such as cellulose, nitrocellulose, and cellulose acetate; polyamides. Copolymers may also be used to form a bulk matrix of a porous material including copolymers of butadiene and styrene, fluorinated ethylene-propylene copolymer, ethylene-chlorotrifluoroethylene copolymer or the like.

Generally, the porous membrane has an average pore size ranging from 0.001 to 50 microns, 0.1 to 5 microns, 0.01 to 1 micron. In some embodiments the average pore size is 0.2 microns. In other embodiments the average pore size is 0.45 microns. The membrane depth, i.e. the distance between the two outer surfaces, or top and bottom surfaces of the membrane, may range from 1-1000 microns, 50-500 microns, 75-200 microns, 90-150 microns.

The surface-modifying polymeric composition of the porous membrane may be comprised of any suitable monomer comprised of two or more polymerizable groups, or a mixture of monomers where at least one of the monomers is comprised of, or consists essentially of, only one polymerizable group and at least one of the monomers is comprised of two or more polymerizable groups. The polymerizable monomer may include a range of solvent-soluble polymerizable monomers that do not bear nucleophilic groups (alcohols, amines, thiols, etc.). Examples of polymers suitable for modifying a membrane surface may include polyethylene glycol (PEG), including polyethylene glycol divinyl ether and polyethylene diglycidyl ether, Nafion vinyl ethers, as well as polyolefins, polyacrylates, polyamides, poly-N-vinylpyrrolidone, polysiloxanes, polyoxazoline, polystyrenics.

In some embodiments the surface modifying polymer may be hydrophilic. The hydrophilic polymer may be neutral in charge so as to minimize any non-specific binding to the modified membrane surface. In other embodiments the surface modifying polymer may provide other desirable chemical properties, e.g., a polar surface, or a specific affinity for a particular material. In some embodiments, the surface-modifying polymer may be comprised of polymerizable monomers which form a surface-modifying polymer or a cross-linked film on at least a portion of the surface of a porous membrane. In some embodiments the polymerizable monomers may be comprised of aliphatic and/or ether linkages. The polymerizable monomers may be comprised of one or more suitable chemical functional groups which may react in the cationic polymerization reaction. Examples of suitable chemical functional groups include epoxides, such as glycidyl ethers, styrene derivatives, vinyl ethers, and in general carbon-carbon double bonds with one of the following substituents: alcoxy, phenyl, vinyl and 1,1-dialkyl. A general class of functional groups polymerizable by cationic polymerization is heterocycles, such as thiiranes, cyclic ethers, lactones, etc. The skilled artisan will appreciate that the choice of monomers will provide control over such variables as cross-link density, flow time, flux, and analyte repellency.

In certain embodiments the polymerizable monomers may be present in the initial coating mixture at a concentration of 0.5-100% volume/volume, 0.5-50% volume/volume, 3-30% volume/volume; 140% volume/volume; 2-15% volume/volume; 5-10% volume/volume. In some embodiments the polymerizable monomers may be present at a concentration of greater than 10% volume/volume. In specific embodiments the polymerizable monomers may be present at a concentration of 10% volume/volume. In other specific embodiments the polymerizable monomers may be present at a concentration of 20% volume/volume. In other specific embodiments the polymerizable monomers may be present at a concentration of 30% volume/volume. In still other specific embodiments the polymerizable monomers may be present at a concentration of 100% volume/volume, thus filling the entire volume of the membrane pores with polymeric composition.

Methods of the Inventions

In some embodiments the invention provides a method of modifying at least a portion of the surface of a porous membrane without the use of acrylic reagents. In other embodiments the invention provides a method of modifying at least a portion of the surface of a porous membrane without the use of plasma energy. In still other embodiments the invention provides a method of modifying at least a portion of the surface of a porous membrane without the use of grafting, e.g. covalently binding a surface-modifying polymeric composition to a porous membrane surface.

In further embodiments the invention provides a method of modifying at least a portion of the surface of a porous membrane comprising contacting at least one surface of the porous membrane with a solution comprising: 1) methanol; 2) polyethylene glycol diglycidyl ether and 3) diphenyl iodonium hexafluorophosphate; 4) hexadecaflurosulphonic acid potassium salt b) removing solvent from the porous membrane of a); c) exposing the porous membrane of b) to ultra-violet light such that the monomer of a) polymerizes.

Some polymeric membranes, e.g. polysulfones, such as polyether sulfone, may interact in a deleterious manner with polyfunctional monomers. Accordingly the methods of the invention contemplate the addition of a rinsing step after the polysulfone membrane has been contacted with the cationic polymerization initiator and the polymerizable monomer. The rinse may be performed using a suitable solvent. Additional rinsing steps after polymerization are also contemplated.

In some embodiments after removal or evaporation of the solvent used in the cationic polymerization the invention further contemplates the additional step of applying a suitable moisture barrier to the porous membrane. The moisture barrier may comprise a suitable container such as a bag, e.g. a polyethylene bag, or a nitrogen blanket which may protect the membrane from moisture in the atmosphere. The barrier may be able to transmit radiant energy, thus where the energy source is light energy, such as UV light, a suitable barrier will be one that is transparent to light.

In still other embodiments the invention provides a method of controlling the degree and extent that a modifying polymeric composition covers one or more surfaces of a porous membrane, e.g., by using diluents or retardants. In still other embodiments the invention provides a method of controlling the flow rate and/or flux of porous membrane. The method may involve varying the choice and concentration of surface-modifying polymeric composition and/or the concentration of initiator. In further embodiments the invention provides a method of modifying a surface of a porous membrane with a suitable chemical functionality by including one or more functional monomers in the cationic polymerization reaction.

In some embodiments of the invention the porous membrane is contacted with a polymerizable monomer and cationic inititator and optionally one or more of the following functional monomers, and a solvent for 1-30 minutes; for 2-5 minutes; for 1-3 minutes; for 0.5-10 minutes; for 2-3 minutes; for 1-2 minutes; for 5-7 minutes. In some embodiments the porous membrane is contacted with a solution comprising 1) a solvent; 2) a polymerizable monomer and 3) a cationic polymerization initiator for more than 10 minutes.

Atmospheric humidity may affect the rate and degree of the polymerization reaction. Cationic polymerization according to the invention may be performed at a humidity ranging from 0-100%. In some embodiments the humidity is less than 90%, less than 80%, less than 70%, less than 60%, less than 50%, less than 40%, less than 30%, less than 20%, less than 10%, less than 5%, less than 1%. In other embodiments cationic polymerization may be performed at a humidity less than 100%. Generally, the lower the humidity is, the better the reaction may be controlled. Thus in some embodiments cationic polymerization may be performed in completely dry atmosphere, e.g., under a dry nitrogen blanket. In instances where the polymerization reaction is performed at a humidity greater than 0%, a higher concentration of initiator may be used to compensate for the increased humidity compared to the concentration of initiator used at 0% humidity.

The porous membranes described herein may be used in any filtration/separation method, including but not limited to the separation of one or more biomolecules. As an example the biomolecules may be a protein, protein fragment or peptide. The protein may be an immunoglobulin such as IgG, IgA, IgM, IgD, IgE or functional equivalent thereof. Immunoglobulin functional equivalents may include immunoglobulin fragments, which retain the ability to bind their antigenic epitope. The porous membranes of the invention may be used for nanofiltration, ultra-filtration and micro-filtration separations.

The porous membranes described herein may be engineered to chemically bind a specific analyte contained in a sample solution which is passed through the filter by the incorporation of at least one functional monomer into polymeric surface coating. As an example, a chemical functionality, which reacts with and binds the desired analyte may be engineered into the surface-modifying polymeric composition. The polymeric composition may also be engineered to incorporate a specific ligand of the desired functionality.

Systems of the Invention

In certain embodiments the invention also provides a system for modifying a surface of a porous membrane. The system may include a porous membrane, a cationic initiator and one or more polymerizable monomers. The system may also optionally include one or more of the following: a solvent, one or more functional monomers, one or more additives, a photo initiator, an energy source, e.g., a source of ionizing or non-ionizing energy. In some embodiments the energy source may be ultra violet radiation. A suitable source of ultra violet radiation may include UV conveyor with two UV light sources, one on top and one on the bottom, as manufactured by Fusion UV Systems, Inc. (Gaithersburg, Md.). In other embodiments the energy source may be an electron beam. A suitable source of an electron beam may include a conveyor with an enclosed EB chamber in the middle, for example as the one manufactured by the Energy Sciences, Inc. (Wilmington, Mass.). In other embodiments of the invention, energy source may not be required to initiate polymerization, which may be simply effected by a strong acid already present in solution.

In certain embodiments the invention provides an automated system for modifying a surface of a porous membrane. Thus any, or all, of the steps may be automated, including mixing the initiator, polyfunctional monomer or a mixture of mono- and polyfunctional monomers, and solvent, applying this mixture to at least a part of the surface of a porous membrane, rinsing the membrane and removing solvent from the membrane.

EXAMPLES

Example 1

PEG Modified Membrane Using Cationic Polymerization and UV

A solution of polyethylene glycol divinyl ether (10% v/v) and diphenyl iodonium hexafluorophosphate (0.1% w/v) was prepared in methanol. A microporous PVDF membrane with the pore size rating 0.22 um was soaked in this solution for 2-5 minutes, removed and dried in air to remove methanol, and then placed in a clear 4 mil polyethylene bag. It was then run through an Ultra-Violet (UV) conveyor equipped with two Fusion UV Systems F450 ultraviolet bulbs (above and below the membrane) at a speed of 25 ft/min. The membrane was then removed from the bag, extracted with methanol using a Soxhlet apparatus, and dried in air. The final membrane had a slight yellowish tint compared to the initial membrane. Weight add-on was approximately 10%, and the Attenuated Total Infra-Red Spectroscopy (ATR-IR) clearly demonstrated that the PEG polymer was present on the membrane surface. The membrane wetted spontaneously with water and showed uniform hydrophilic character across its whole depth. This finding was confirmed by wetting the membrane and observing it with environmental Scanning Electron Microscopy (SEM). The modified membrane allowed water to flow through easily and had a water flux loss of approximately 10% compared to an unmodified membrane (flow time of 100 mL MilliQ water of 50 seconds vs. 42 seconds). The modified membrane exhibited low protein binding (18 $\mu g/cm^2$ of goat anti-rabbit IgG). Flux and protein binding remained unchanged after a 3-hour exposure to a 1M solution of NaOH. Comparison data are presented in Table 2.

TABLE 2

|  | Flow time of 100 mL of MilliQ water (seconds) of freshly modified membrane | Protein (IgG) binding (ug/cm2) |
| --- | --- | --- |
| 0.22 um PVDF membrane as prepared in example 1 | 50 | 18 |
| 0.22 um PVDF membrane as prepared in example 1 and treated with 1M NaOH for 3 hours | 50 | 18 |
| 0.22 um Durapore ®* membrane (hydrophilized with a mixture of acrylates according to 4,618,533) | 49 | 17 |
| 0.22 um Durapore ® membrane treated with 1M NaOH for 3 hours | 420 | 124 |

*Durapore ® is a PVDF membrane

Example 2

PEG Modified Membrane Using Cationic Polymerization and EB

A solution of polyethylene glycol divinyl ether (20% v/v), diphenyl iodonium hexafluorophosphate (0.2% w/v), and hexadecafluorosulphonic acid potassium salt (HFSK) (2% w/v) was prepared in methanol. A microporous UPE membrane with a pore size rating of 1.0 μm was soaked in this solution for 2-5 minutes, removed from the solution and dried in air to remove the methanol. The membrane was exposed to an electron beam (EB) such that it received a total dosage of 2 MRads. The membrane was extracted with methanol using a Soxhlet apparatus, and dried in air. The final membrane had a yellowish tint compared to the original material. It wetted well in water. Weight add-on was around 60-70% and flow time of 100 ml of water increased from 3 seconds for an unmodified membrane to 5-6 seconds for the modified one. Protein binding to this membrane was 50 ug/cm$^2$.

Example 3

Cationic Polymerization of Glycidyl Ethers on PVDF Membranes

A methanolic solution was prepared containing hexadecafluorosulphonic acid potassium salt (HFSK) (1% w/v), diphenyl iodonium hexafluorophosphate (1% w/v) and ethylene glycol diglycidyl ether (20% v/v). A microporous PVDF membrane with pore size rating 0.22 um was soaked in this solution for 2-5 minutes, removed and dried in air to remove the methanol, and then placed in a clear 4 mil polyethylene bag. It was then run through a UV conveyor at the speed 10 ft/min. The membrane was kept in the bag and placed in the oven at 50° C. for 1 hour; removed, extracted with methanol using a Soxhlet apparatus, and dried in air. The final membrane had the same appearance as original material, wetted very well in water, had a weight add-on of 7.9% and protein binding of 14.8 ug/cm$^2$. For comparison, the membrane prepared under the same conditions without oven treatment was hydrophobic.

Example 4

Cationic Polymerization of Glycidyl Ethers without Heating

The Procedure in Example 3 was repeated, the membrane was not put in the oven, but allowed to stay in the bag at room temperature for a 24-hour period, after which rinsing and extraction were performed. The final membrane had the same appearance as original material, wetted very well in water, had a weight add-on of 30.4% and a protein binding of 12.9 ug/cm$^2$.

Example 5

Cationic Polymerization of Diglycidyl Ethers without Heating

The Procedure in Example 4 was repeated with polyethylene glycol diglycidyl ether (MW 550, Aldrich) (20% v/v) instead of ethylene glycol diglycidyl ether. The membrane was not put in the oven, but allowed to stay in the bag at room temperature for a 17-hour period, after which rinsing and extraction were performed. The final membrane had the same appearance as original material, wetted very well in water, had a weight add-on of 30.6% and a protein binding of 12.7 ug/cm2.

Example 6

Cationic Copolymerization of Diglycidyl Ethers

The Procedure in Example 5 was repeated with both polyethylene glycol diglycidyl ether (MW 550, Aldrich) (10% v/v) and ethylene glycol diglycidyl ether (10% v/v) in the coating mix. The membrane was left at room temperature for 17 hours, after which rinsing and extraction were performed. The final membrane had the same appearance as original material, wetted very well in water, had weight add-on 16.2% and protein binding 28.5 ug/cm$^2$.

Example 7

Cationic Polymerization of Glycidyl Ethers on UPE Membranes

The Procedure of Example 5 was repeated using 20% ethylene glycol diglycidyl ether, 2% HFSK, and 1.0 um UPE membrane. The membrane was left in the bag to cure at room temperature for 17 hours. After extraction and drying, the membrane wetted with water quickly and uniformly. Weight add-on was 50-60%, flux loss was negligible.

Example 8

Cationic Polymerization of Ethylene Glycol Diglycidyl Ether and Benzyl Glycidyl Ether on UPE Membranes The Procedure of Example 7 was repeated with 20% ethylene glycol diglycidyl ether and a 1.0 um UPE membrane, with added 5% (w/v) benzyl glycidyl ether. Weight add-on was 50-60%, flux loss was negligible. Infrared spectrum indicated the presence of aromatic character in the membrane coating (700 cm$^{-1}$).

Example 9

Cationic Polymerization of Glycidyl Ethers on PES Membrane

A solution of polyethylene glycol divinyl ether (30% v/v) and diphenyl iodonium hexafluorophosphate (DPIHP) (0.4% w/v) was prepared in methanol. A microporous PES membrane with the pore size rating 0.22 um was soaked in this solution for 30 minutes, removed, briefly rinsed with 0.4% solution of DPIHP in methanol, dried in air for 10 minutes, and then exposed to 10 MRads of electron beam radiation. The membrane was then extracted with methanol using a Soxhlet apparatus, and dried in air. The final membrane had a slight yellowish tint compared to the initial membrane. Weight add-on was about 4%, and the Attenuated Total Reflectance Infra-Red Spectroscopy (ATR-IR) clearly demonstrated the presence of PEG polymer on the membrane surface. Flux loss was approximately 50% compared to unmodified membrane (flow time of 100 mL MilliQ water of 32 seconds vs. 20 seconds). The modified membrane exhibited very low protein binding (16.2 um/cm$^2$ of goat anti-rabbit IgG).

Example 10

Cationic Polymerization of Glycidyl Ethers on PVDF Membrane Using Water as a Solvent An aqueous solution was prepared containing hexadecafluorosulphonic acid potassium salt (HFSK) (2% w/v), diphenyl iodonium hexafluorophosphate (1% w/v) and ethylene glycol diglycidyl ether (20% v/v). A microporous PVDF membrane with pore size rating 0.22 um was prewetted with isopropanol, exchanged into deionized water, and soaked in the solution for 3 minutes, removed and dried in oven at 50° C. for 20 minutes to remove water, and then placed in a clear 4 mil polyethylene bag. It was then run through a UV conveyor at the speed 10 ft/min. The membrane was kept in the bag at room temperature for 17 hours; removed from the bag, extracted with methanol using a Soxhlet apparatus, and dried in air. The final membrane had the same appearance as the original material, wetted well in water, had a weight add-on of 16% and water flux about 50% of the flux of original, unmodified membrane.

Example 11

Cationic Polymerization of 100% Divinyl Ether on PVDF Membrane

Diphenyl iodonium hexafluorophosphate was dissolved in pure triethyleneglycol divinyl ether to the concentration of 1% (w/v). A microporous PVDF membrane with the pore size rating 0.22 um was soaked in this solution for 2 minutes, removed and placed in a clear 4 mil polyethylene bag. It was then run through a Ultra-Violet (UV) conveyor equipped with two. Fusion UV Systems F450 ultraviolet bulbs (above and below the membrane) at a speed of 25 ft/min. The membrane was then removed from the bag, extracted with methanol using a Soxhlet apparatus, and dried in air. The final membrane had a yellow color compared to the initial membrane. Weight add-on was approximately 125%, and the membrane was completely filled with hydrophilic polymer so the water flux was negligibly small.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Many modifications and variations of this invention can be made without departing from its spirit and scope, as will be apparent to those skilled in the art. The specific embodiments described herein are offered by way of example only and are not meant to be limiting in any way. It is intended that the specification and examples be considered as exemplary only, with a true scope and spirit of the invention being indicated by the following claims.

What is claimed is:

1. A method of modifying at least a portion of the surface of a porous membrane with a surface modifying polymeric composition such that the membrane does not require prewetting with an organic solvent prior to filtration of a solution, the method comprising:

a) contacting the porous membrane with a surface modifying composition comprising:
1) polymers selected from the group consisting of polyethylene glycol, polyethylene glycol divinyl ether, polyethylene glycol diglycidyl ether, benzyl glycidyl ether, ethylene glycol diglycidyl ether, triethyleneglycol divinyl ether, polysiloxanes, polyoxazoline, polystyrenics, and combinations thereof, wherein the polymers are present in the surface modifying polymeric composition in a concentration of about 3 to about 30% vol/vol;
2) a cationic polymerization initiator; and
3) a solvent;

b) placing the membrane in a moisture barrier container to protect the membrane from moisture in the atmosphere;

c) polymerizing the polymers of 1) on the surface of the membrane thereby modifying at least a portion of the surface of the porous membrane with a polymerized surface modified polymeric composition.

2. The method of claim 1, wherein the porous membrane is a hydrophobic bulk matrix selected from the group consisting of polyethylene, polypropylene, polymethylpentene, polystyrene, a substituted polystyrene; poly(tetrafluoroethylene), polyvinylidene fluoride; polysulfone, polyethersulfone, polyethylene terephthalate, polybutylene terephthalate, polyacrylates, polycarbonates, polyvinyl chloride and polyacrylonitriles.

3. The method of claim 1, wherein the polymers are hydrophilic.

4. The method of claim 3, wherein the polymers are present in the surface modifying polymeric composition in a concentration of about 10 to about 20% vol/vol are selected from polysiloxanes, polyoxazoline, and polystyrenics.

5. The method of claim 1, further comprising:
d) removing the membrane from the moisture barrier container;
e) extracting with a solvent; and
f) drying the membrane,
wherein the cationic polymerization initiator is selected from the group consisting of diazonium salts, onium salts, and organometallic complexes.

6. The method of claim 1, wherein the cationic polymerization initiator is an onium salt is selected from the group consisting of diphenyl iodonium hexafluorophosphate, tetramethylene sulfonium hexafluorarsenate, triphenylsulfonium fluoroborate, triphenylsulfonium chloride, diphenyliodonium fluoroborate, triphenylsulfonium hexafluoroarsenate, triphenylsulfonium, and hexafluoroantimonate.

7. The method of claim 1, further comprising a radiant energy source.

8. The method of claim 7, wherein the radiant energy source is selected from the group consisting of ultraviolet light, visible light, infrared light, gamma radiation, radiation from an electron beam, microwave radiation and radio-frequency radiation.

9. The method of claim 1, further comprising a radiant energy source selected from the group consisting of ultraviolet light, visible light, infrared light, gamma radiation, radiation from an electron beam, microwave radiation and radio-frequency radiation,
wherein the radiant energy source is applied to the membrane in step c) while the membrane is located within the container.

10. The method of claim 1, wherein the solvent is selected from the group consisting of water, methanol, ethanol, isopropanol, acetonitrile, hexane, cyclohexane, petroleum ether, diethyl ether, acetone, tetrahydrofuran, and dichloromethane.

11. A porous cationic polymerized surface-modified filtration and separation membrane for filtering a biomolecule containing solution which does not require prewetting with an organic solvent prior to the filtration and separation of the biomolecules from the solution, having a cationic polymerized surface modified without the use of acrylate-based functionalities, plasma discharge or corona discharge, comprising:
  a) a porous polymeric membrane including a hydrophobic bulk matrix having a surface modified by
  b) a surface modifying hydrophilic cationic polymerized composition polymerized-by a cationic polymerization initiator selected from the group consisting of diazonium salts, onium salts, and organometallic complexes, on at least a portion of the surface of the hydrophobic porous membrane, the polymerized composition including a polymer selected from the group consisting of polyethylene glycol, polyethylene glycol divinyl ether, polyethylene glycol diglycidyl ether, benzyl glycidyl ether, ethylene glycol diglycidyl ether, triethyleneglycol divinyl ether, polysiloxanes, polyoxazoline, and combinations thereof.

12. The porous surface-modified membrane of claim 11, wherein the hydrophobic bulk matrix is selected from the group consisting of polyethylene, polypropylene, polymethylpentene, poly(tetrafluoroethylene), polyvinylidene fluoride; polysulfone, polyethersulfone, polyethylene terephthalate, polybutylene terephthalate, polyacrylates, polycarbonates, polyvinyl chloride and polyacrylonitriles.

13. The porous surface-modified membrane of claim 11, wherein the onium salt is selected from the group consisting of diphenyl iodonium hexafluorophosphate, tetramethylene sulfonium hexafluoroarsenate, triphenylsulfonium fluoroborate, triphenylsulfonium chloride, diphenyliodonium fluoroborate, triphenylsulfonium hexafluoroarsenate, and triphenylsulfonium hexafluoroantimonate.

14. A method of modifying a surface of a porous membrane with a polymerized surface modifying composition without the use of acrylate-based functionalities, plasma discharge or corona discharge, comprising:
  a) contacting the porous membrane with a surface modifying solution comprising:
    1) a first solvent;
    2) a polymer selected from the group consisting of polyethylene glycol, polyethylene glycol divinyl ether, polyethylene glycol diglycidyl ether, benzyl glycidyl ether, ethylene glycol diglycidyl ether, triethyleneglycol divinyl ether, polysiloxanes, polyoxazoline, polystyrenics, and combinations thereof, wherein the polymers are present in the surface modifying solution in a concentration from about 3 to about 30% vol/vol;
    3) a cationic polymerization initiator selected from the group consisting of diphenyl iodonium hexafluorophosphate, tetramethylene sulfonium hexafluoroarsenate, triphenylsulfonium fluoroborate, triphenylsulfonium chloride, diphenyliodonium fluoroborate, triphenylsulfonium hexafluoroarsenate, and triphenylsulfonium hexafluoroantimonate; and
    4) hexadecafluorosulphonic acid;
  b) soaking the membrane in the solution;
  c) rinsing the membrane with a second solvent;
  d) removing the first and second solvents from the surface modifying solution on the membrane; and
  e) exposing the membrane having the surface modifying solution located thereon a radiant energy source selected from the group consisting of ultraviolet light, visible light, infrared light, gamma radiation, radiation from an electron beam, microwave radiation and radio-frequency radiation such that the polymer of step a) polymerizes on the surface of the membrane, modifying the surface and forming a polymerized surface modified polymeric composition.

15. A method of claim 14 further comprising a step between step d) and step e), of placing the membrane in a moisture barrier container to protect the membrane from moisture in the atmosphere;
  wherein the porous membrane is selected from the group consisting of polysulfone, polyethersulfone, and polyphenylsulfone; and the first and second solvents are selected from the group consisting of water, methanol, ethanol, isopropanol, acetonitrile, hexane, cyclohexane, petroleum ether, diethyl ether, acetone, tetrahydrofuran, and dichloromethane.

16. A method of modifying at least a portion of the surface of a porous membrane with a surface modifying polymeric composition such that the membrane does not require prewetting with an organic solvent prior to filtration of a solution, the method comprising:
  a) contacting the porous membrane with a surface modifying composition comprising:
    1) polymers selected from the group consisting of polyethylene glycol, polyethylene glycol divinyl ether, polyethylene glycol diglycidyl ether, benzyl glycidyl ether, ethylene glycol diglycidyl ether, triethyleneglycol divinyl ether, polysiloxanes, polyoxazoline, polystyrenics, and combinations thereof, wherein the polymers are present in the surface modifying polymeric composition in a concentration of about 3 to about 30% vol/vol,
    2) a cationic polymerization initiator including an onium salt selected from the group consisting of diphenyl iodonium hexafluorophosphate, tetramethylene sulfonium hexafluorarsenate, triphenylsulfonium fluoroborate, triphenylsulfonium chloride, diphenyliodonium fluoroborate, triphenylsulfonium hexafluoroarsenate, triphenylsulfonium, and hexafluoroantimonate, and
    3) a solvent; and
  b) polymerizing the surface modifying polymers on the surface of the membrane thereby modifying at least a portion of the surface of the porous membrane with a polymerized surface modified polymeric composition.

17. The method of claim 16, further comprising step a-1), which occurs between step a) and step b), applying a moisture barrier to the porous membrane to protect the membrane from moisture in the atmosphere selected from the group consisting of placing the porous membrane in a moisture barrier container or applying a nitrogen blanket to the porous membrane.

18. The method of claim 17, further comprising:
  c) removing the membrane from the moisture barrier container;
  d) extracting with a solvent; and
  e) drying the membrane.

19. The method of claim 17, further comprising a radiant energy source selected from the group consisting of ultraviolet light, visible light, infrared light, gamma radiation, radiation from an electron beam, microwave radiation and radio-frequency radiation, wherein the radiant energy source is applied to the membrane in step b) while the membrane is located within the container.

20. The method of claim 16, wherein the porous membrane is a hydrophobic bulk matrix selected from the group consisting of polyethylene, polypropylene, polymethylpentene, polystyrene, a substituted polystyrene; poly(tetrafluoroethylene), polyvinylidene fluoride; polysulfone, polyethersulfone, polyethylene terephthalate, polybutylene terephthalate, polyacrylates, polycarbonates, polyvinyl chloride and polyacrylonitriles.

21. The method of claim 16, wherein the polymers are hydrophilic.

22. The method of claim 21, wherein the polymers are selected from polysiloxanes, polyoxazoline, and polystyrenics, and are present in the surface modifying polymeric composition in a concentration of about 10 to about 20% vol/vol.

23. The method of claim 16, further comprising a radiant energy source selected from the group consisting of ultraviolet light, visible light, infrared light, gamma radiation, radiation from an electron beam, microwave radiation and radiofrequency radiation.

24. The method of claim 16, wherein the solvent is selected from the group consisting of water, methanol, ethanol, isopropanol, acetonitrile, hexane, cyclohexane, petroleum ether, diethyl ether, acetone, tetrahydrofuran, and dichloromethane.

* * * * *